United States Patent
Bystrak

[11] Patent Number: 5,483,561
[45] Date of Patent: Jan. 9, 1996

[54] REACTOR CORE INSPECTION PROBE

[76] Inventor: Richard Bystrak, P.O. Box 207, Montrose, N.Y. 10548

[21] Appl. No.: 310,880

[22] Filed: Sep. 22, 1994

[51] Int. Cl.$^6$ .................................................. G21C 17/00
[52] U.S. Cl. .................................................. 376/258
[58] Field of Search .................................. 376/245, 248, 376/249, 252, 258, 260

[56] References Cited

U.S. PATENT DOCUMENTS 3,764,736  10/1973  Kosky et al. ......................... 376/248

FOREIGN PATENT DOCUMENTS 2846490  5/1979  Germany .............................. 376/258
53-120090 10/1978 Japan ..................................... 376/258

*Primary Examiner*—Daniel D. Wasil

[57] ABSTRACT

A reactor core inspection apparatus is disclosed which comprises a hollow tube containing a distally located radial opening, and having an ultrasonic transducer located therein. The tube is connected by a hollow cable to a calibrated degree wheel which allows rotation of the tube once lowered through the top of a partially raised upper internals assembly of a reactor. The transducer is connected to a detector which senses whether one of the fuel assemblies contained within the core has become entangled with the internals assembly prior to full removal of the assembly. If a hangup is detected, the assembly can be lowered in an attempt to disentangle the fuel assembly, to avoid damage.

7 Claims, 2 Drawing Sheets

REACTOR CORE INSPECTION PROBE

TECHNICAL FIELD

This invention relates to devices for inspecting the internal structure of a nuclear reactor and more particularly to a device for inspecting the internal reactor structure during disassembly.

BACKGROUND

A core of a nuclear reactor is composed of a plurality of fuel assemblies which require periodic removal for refueling or repair. These fuel assemblies are typically composed of a group of fuel rods incorporated with plates which maintain the fuel rods in proper proximity to allow a cooling fluid to flow around the rods to maintain the rods at a proper temperature. Consequently, the fuel assemblies are usually surrounded by various auxiliary structures such as baffles, which direct cooling flow for optimum efficiency to cool the fuel rods. It is typical for the reactor core fuel assemblies to be aligned in the reactor vessel by lower and upper assemblies known as internals packages.

During refueling, the upper reactor internals are lifted out of the reactor housing. Presently, it is difficult to determine if one of the fuel assemblies, during lifting, has become entangled with the reactor upper internals structures. If this occurs, a fuel assembly may be pulled out of the core and dropped. Thus, the fuel assembly or upper internals may be damaged, requiring costly and time consuming repairs.

Prior attempts to inspect the upper internals package during lifting utilized a video camera. The distance of lift required to perform the inspection, generally above the reactors upper flanges, could cause damage before the entanglement was detected. Consequently, other inspection methods and apparatus are required.

SUMMARY OF THE INVENTION

It is an object of the present invention to avoid damage during refueling.

It is a further object to provide apparatus for inspecting the reactor internals during removal to detect potential entanglements and thus halt the operation prior to damaging the fuel assembly.

These and other objects of the present invention are achieved by an inspection assembly comprising:

an inspection means sized for insertion into a partially raised reactor internals package, and having a radially oriented opening at a distal end thereof;

detecting means located within the inspection tube adjacent the opening;

means for lowering the inspection tube to a position where the opening is below the internals package;

rotating means for rotating the inspection tube in a complete circle while inserted within the internals package, such that the detection means translate in a full circle below the package to detect any entangled articles.

In a preferred embodiment, the inspection means is a tube having an ultrasonic transmitter located adjacent to the radial opening. After the internals package is partially lifted, the tube is lowered by a cable into a passage with the reactor, with the opening oriented in conformance with a degree wheel located on a rotating device. Once lowered into the reactor, to a point just below the lowermost portion of the internals package, the ultrasonic transmitter is activated and the probe rotated a full 360°. Any anomaly in the reading will indicate that a fuel assembly may be entangled with the internals package, and allow an operator to lower the internals package or take other steps to disengage the fuel assembly before a second attempt is made to raise the internals package out of the reactor. Another option would be to continue with the lift in increments and periodic reinspections before the upper internals raised height exceeds that of the assembly length to determine if the assembly dislodged off the upper internals core plate. In a preferred embodiment, a central drive shaft is removed from the upper internals package to provide the passage for the tube. This provides a central location for the inspection.

BRIEF DESCRIPTIONS OF THE DRAWINGS

FIG. 1 is a view of the inspection apparatus of the invention; FIG. 1a is a top view of the apparatus taken along line 1a—1a.

DETAILED DESCRIPTION OF THE INVENTION

Figures 1, 1A:
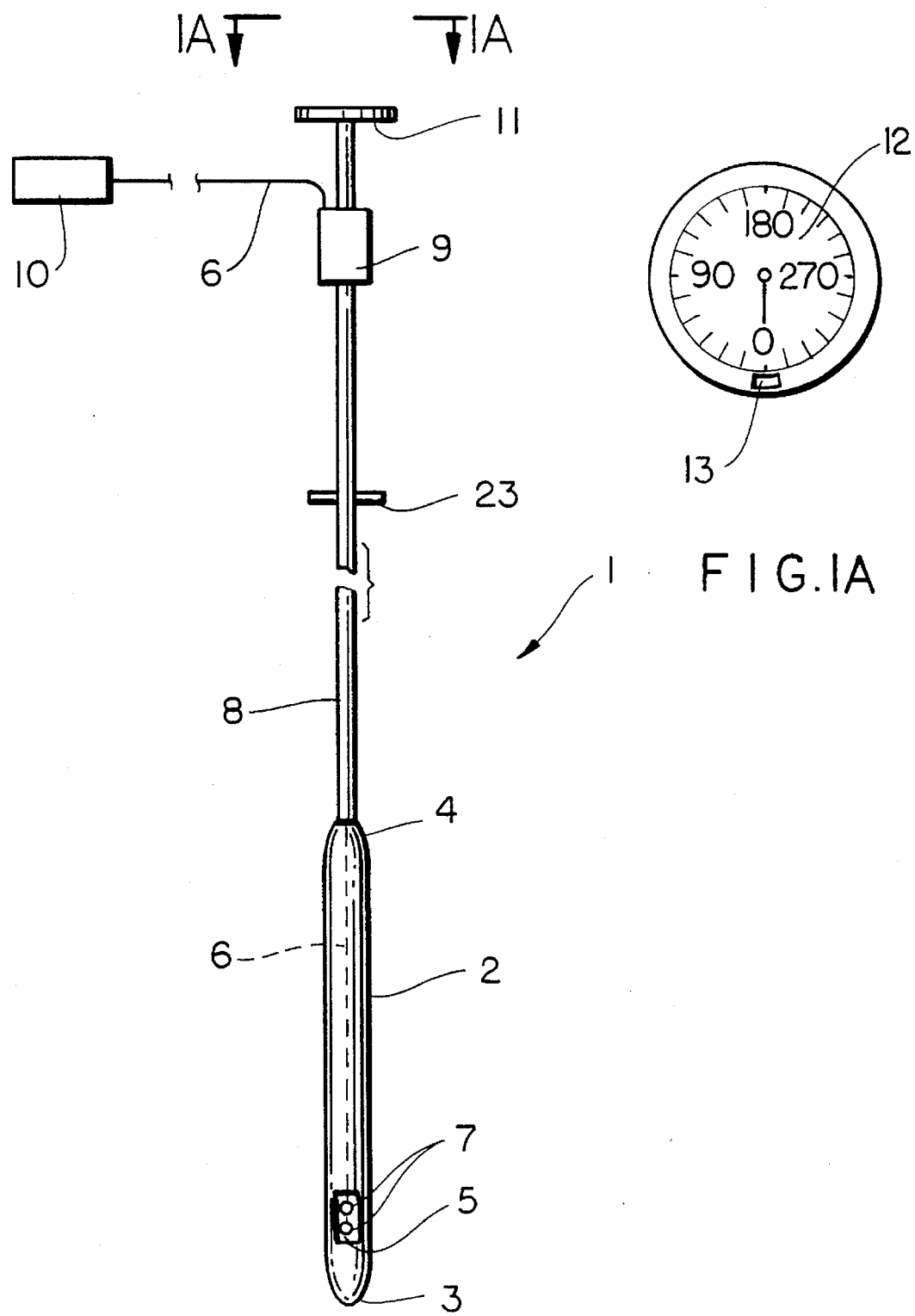

Referring to FIG. 1, an inspection apparatus 1 is shown. The apparatus includes a probe tube 2 having a diameter sufficient to pass through an opening of about 3 inches. The tube 2 has a pair of tapered ends 3 and 4. The tapered ends minimize binding when the tube is lowered or raised into a reactor internals package. The probe is substantially hollow and has a radial opening 5. The tube is hollow to allow passage of a signal wire 6 therethrough. The signal wire is attached at one end to a detection means 7 located in a distal end of the tube, adjacent to the opening 5.

The detection means may comprise any sensor capable of detecting an improper connection to a fuel assembly or other internal structures in a nuclear reactor. Preferably, the detection means is one or more ultrasonic transducers, preferably two, which will operate in the frequency range of about 200 kilohertz and which are capable of operating in an environment of 30,000 rad for a period of several hours. The transducer should be designed to operate in an underwater environment and have a capability for locating an entanglement within 1 inch ± in a 12 foot diameter core. Such transducers are quite small, allowing an initial inspection to be undertaken when the package is lifted by from about 2–12 inches, well before serious damage could occur.

The signal wire 6 exits the tube at the proximal end 4 and is of sufficient length to extend away from the nuclear reactor to a remote monitoring means.

Preferably, the signal wire passes in conjunction with a cable 8 used to raise or lower the inspection apparatus. The cable may optionally be connected to a winch or other means for raising or lowering the inspection apparatus, though it may be lowered by hand. The signal wire 6 separates from the cable 8 at a termination box 9 with the signal wire connected to a monitoring means 10.

With an ultrasonic transducer, an oscilloscope or other comparable device may be used to determine if there is an entanglement of a fuel assembly to a member being lifted.

Included with the cable are means for rotating the inspection apparatus while in the inspection position. A hand wheel 11 incorporating a degree scale 12 is attached to the cable 8 and coordinated with the radial opening by a mark 13 such that a visual indication is obtained of the initial position of the radial opening. If, during rotation, an improper entanglement is detected, its location is precisely determined by reference to the degree scale and steps can be taken to disentangle the fuel assembly from the structure.

Figure 2:
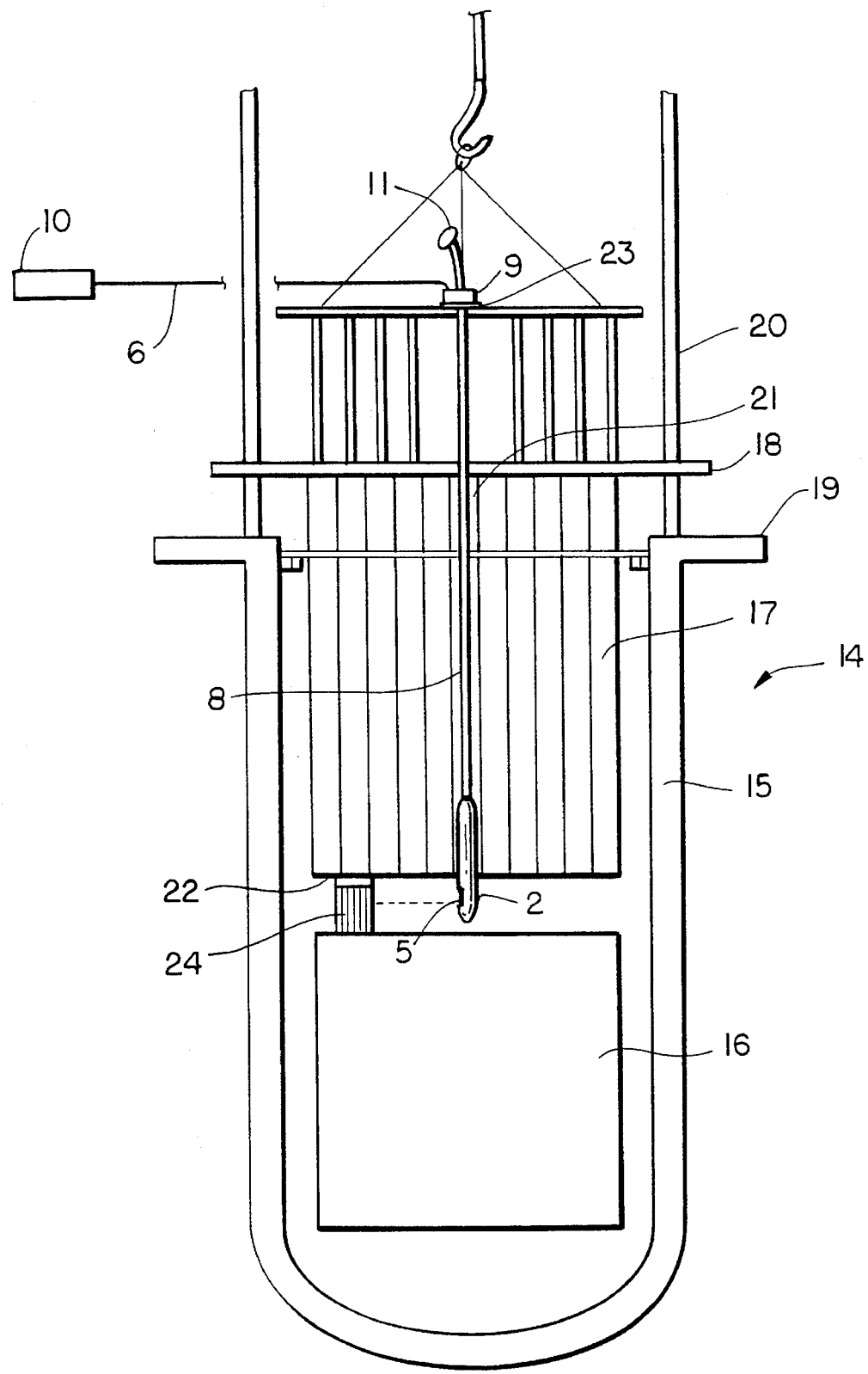
FIG. 2 shows the inspection apparatus inserted into a reactor internals package.

Referring to FIG. 2, the apparatus is shown in an inspection position. A nuclear reactor 14 has a vessel 15, with a reactor core 16 disposed therein. Above the core is disposed an internals package 17. This may comprise various structures such as baffles or other devices, and the term "Package" is herein defined as any structures disposed above the core which may require periodic removal. These devices are attached to an upper flange 18 which rests on the containment vessel flange 19. To remove the package, the upper flange is lifted along guides 20, as shown.

During this lifting process, it is possible that a fuel assembly will become entangled with the upper internal structure and be damaged during removal. Previously, it was necessary to raise the upper internals package above the reactor flange so a camera could be used to determine if an assembly was entangled. However, this distance of lift could cause damage before the entanglement is detected. Thus, such an inspection is inadequate.

In this instance, the internal package has been partially raised about 12 inches. Once raised, the inventive apparatus is inserted through a passage 21 in the internal structure. For example, such an internal package typically includes a central drive shaft and after the shaft has been removed, the inventive apparatus can be disposed within the passage provided for that shaft.

The tube 2 is lowered into the passage 21 via the cable 8 until the portion of the tube containing the radial opening 5, passes through a lowermost surface 22 of the internals package. Preferably, the cable includes a stop 23 which is a flat disk or plate which may be located, based on the length of the internals package, to assure that the radial opening exits the upper internal assembly bottom plane and maintains the tube in that position during subsequent rotation. This stop can be a clamp type device which is adjustable for different reactor internal assemblies or, if the package is of a standard depth, can be a disk or plate permanently affixed to the cable.

The hand wheel 11 and the degree scale 12 are located above the top portion of the internals package so that it can be manipulated by hand. The signal cable 6 which exits the termination box 9 is connected to a detection device 10 such as an oscilloscope. At that time, the sensor is activated and the tube rotated a full 360° below the internals package. If an ultrasonic transducer is used, this transducer will detect whether there is a metallic object disposed between the opening 5 and the vessel wall which would normally indicate that a fuel assembly 24 has become entangled and is being raised with the internals package. If such a signal is detected, the degree scale is consulted to determine where the hangup has occurred and the exact fuel assembly involved and steps are taken to disentangle the assembly before further lifting is attempted. If a decision is made to continue with the lift, the invention can be used periodically to determine if the assembly has disengaged at any time during the lift.

If, after rotation, it is determined that there has been no hangup, the inspection apparatus is removed and the upper internals package is then lifted completely from the vessel.

The cable is preferably a hollow core stainless steel torque resistant flexible cable of a fixed length such that the signal wire can pass through the cable to prevent damage to the delicate signal wire. Additionally, the probe can have a pair of screw type caps forming the tapered ends at both the proximal and distal portions to allow access to the sensor for removal and/or replacement. The tube and tapered portions are also preferably composed of stainless steel and weighted at the lower end to maintain an axial alignment within 1° of the vertical to assure transducer report accuracy. The tube preferably has a diameter of about 2 inches and a length of about 3 feet to better control alignment of the probe during use and to prevent hang up inside the package.

While a preferred embodiment of the present invention has been shown and described, it will be understood by those skilled in the art that various changes or modifications could be made without varying from the scope of the invention.

I claim:

1. An inspection apparatus for determining entanglement during lifting of an internals package from a pressure vessel of a reactor comprising:

an inspection means sized for insertion into the internals package, and having a radially oriented opening at a distal end thereof;

detection means located within the inspection means adjacent the radial opening;

means for lowering the inspection means into the reactor pressure vessel to a position where the opening is below a lowermost surface of the internals package;

rotating means for rotating the inspection means in a complete circle while inserted within the package, such that the detection means translate in a full circle below the package to detect any entangled articles, the rotating means having indication means for indicating the position of the radial opening of the inspection means during rotation.

2. The inspection apparatus of claim 1 further comprising monitoring means connected to the detection means and being responsive to signals issuing therefrom.

3. The inspection apparatus of claim 1 wherein the detection means a visual or non-visual sensor capable of indicating if an article is entangled within the reactor pressure vessel when the internals package is lifted by about 2 to 12 inches from its location during reactor operation.

4. The inspection apparatus of claim 1 wherein the lowering means comprises a hollow core cable having a first end attached to the inspection means and a second end attached to the rotating means.

5. The inspection apparatus of claim 1 wherein the inspection means comprise a hollow cylinder having a pair of tapered ends.

6. The inspection apparatus of claim 1 wherein the detection means are capable of locating an entanglement to within ± one inch around a circumference of the reactor pressure vessel.

7. A method for inspecting a pressure vessel of a reactor to indicate entanglement of a reactor internal package with an article comprising:

providing an inspection apparatus comprising an inspection means sized for insertion into the internals package, and having a radially oriented opening at a distal end thereof, detection means located within the inspection means adjacent the radial opening, means for lowering the inspection means into the reactor pressure vessel to a position where the opening is below a lowermost surface of the internals package, rotating means for rotating the inspection means in a complete circle while inserted within the internals package, such that the detection means translate in a full circle below the internals package to detect any entangled articles, the rotating means having indicating means for indicating the position of the radial opening of the inspection means during rotation;

partially raising the internals package;

inserting the inspection means into the internals package, such that the radial opening is positioned below the lowermost portion of the internals package;

rotating the inspection tube in a full circle while observing the detection means; and, using the detection means to sense whether any article has become entangled during lifting of the internals package from the reactor, the indicating means indicating the location of any detected entanglement.

* * * * *